United States Patent [19]
Saitoh

[11] Patent Number: 5,438,434
[45] Date of Patent: Aug. 1, 1995

[54] PORTABLE APPARATUS FOR PRINTING AN IMAGE ON FILM AND DISPLAYING THE IMAGE ON A SCREEN

[75] Inventor: Toshihide Saitoh, Chiba, Japan

[73] Assignee: Sony Corporation, Tokyo, Japan

[21] Appl. No.: 215,622

[22] Filed: Mar. 22, 1994

[30] Foreign Application Priority Data

Mar. 23, 1993 [JP] Japan .................................. 5-064114

[51] Int. Cl.[6] .......................... H04N 1/04; H04N 1/46; G03B 13/28; G03F 3/10
[52] U.S. Cl. ..................................... 358/487; 358/512; 358/527; 355/45; 348/344
[58] Field of Search ............... 348/184, 203, 222, 270, 348/277, 280, 325, 333, 335, 336, 341, 343, 344, 369, 373, 376, 743, 744, 739, 776, 781–783, 785, 790, 794, 832, 835; 358/487, 505, 512, 527, 302, 906, 909.1; 355/45

[56] References Cited

U.S. PATENT DOCUMENTS

| | | | |
|---|---|---|---|
| 4,262,301 | 4/1981 | Erlichman | 358/527 |
| 4,367,033 | 1/1983 | Watanabe | 355/5 |
| 4,541,010 | 9/1985 | Alston | 348/333 |
| 4,751,553 | 6/1988 | Fukasawa | 355/45 |
| 4,800,413 | 1/1989 | Ito et al. | 355/45 |
| 4,879,572 | 11/1989 | Onuki et al. | 355/45 |
| 4,881,099 | 11/1989 | Onuki et al. | 355/45 |
| 4,947,213 | 8/1990 | Murata et al. | 355/45 |
| 5,084,756 | 1/1992 | Muehlhausen | 348/739 |
| 5,115,308 | 5/1992 | Onuki | 348/344 |
| 5,140,428 | 8/1992 | Park | 348/739 |

FOREIGN PATENT DOCUMENTS 0382044 8/1990 European Pat. Off. .
0395806 11/1990 European Pat. Off. .

OTHER PUBLICATIONS

Funkschau vol. 43, No. 12, 2 Jun. 1971, Munchen, DE p. 384 "Schnappschusse vom Bildschirm ohne Fotoapparat" No Translation.

Primary Examiner—Edward L. Coles, Sr.
Assistant Examiner—Kimberly A. Williams
Attorney, Agent, or Firm—William S. Frommer; Alvin Sinderbrand

[57] ABSTRACT

A portable apparatus for printing an image on a film or monitoring the image on a display screen. An image generator, such as a CRT, generates a viewable image. The display screen is in optical communication with the image generator and defines a first optical path. A first reflector is selectively movable into the first optical path to intercept the generated image in order to reflect the image over a second folded optical path, defined by second and third reflectors, to the film. Along the second folded optical path is an optical filter for filtering predetermined frequency components of the generated image. In a print mode, the first reflector is driven into the first optical path, such that the film is in optical communication with the image generator, for exposing the film to the generated image. In a monitor mode, the first reflector is driven out of the first optical path, such that the display screen is in optical communication with the image generator for displaying the generated image.

16 Claims, 9 Drawing Sheets

PORTABLE APPARATUS FOR PRINTING AN IMAGE ON FILM AND DISPLAYING THE IMAGE ON A SCREEN

BACKGROUND OF THE INVENTION

This invention relates to a printing and monitoring apparatus and, more particularly, to a portable self-contained apparatus capable of exposing film to an optical image or displaying the optical image on a screen.

Prior to producing a hard copy of an optical image, it is often desirable to view the image in order to determine any visible errors or to simply discriminate against printing a particular image. Viewing the image prior to producing a hard copy on film may save time and expense by avoiding undesirable prints. However, conventional image printing devices lack a monitor for viewing the image, or at best, provide a separate large screen monitor for projecting the image.

Figure 1:
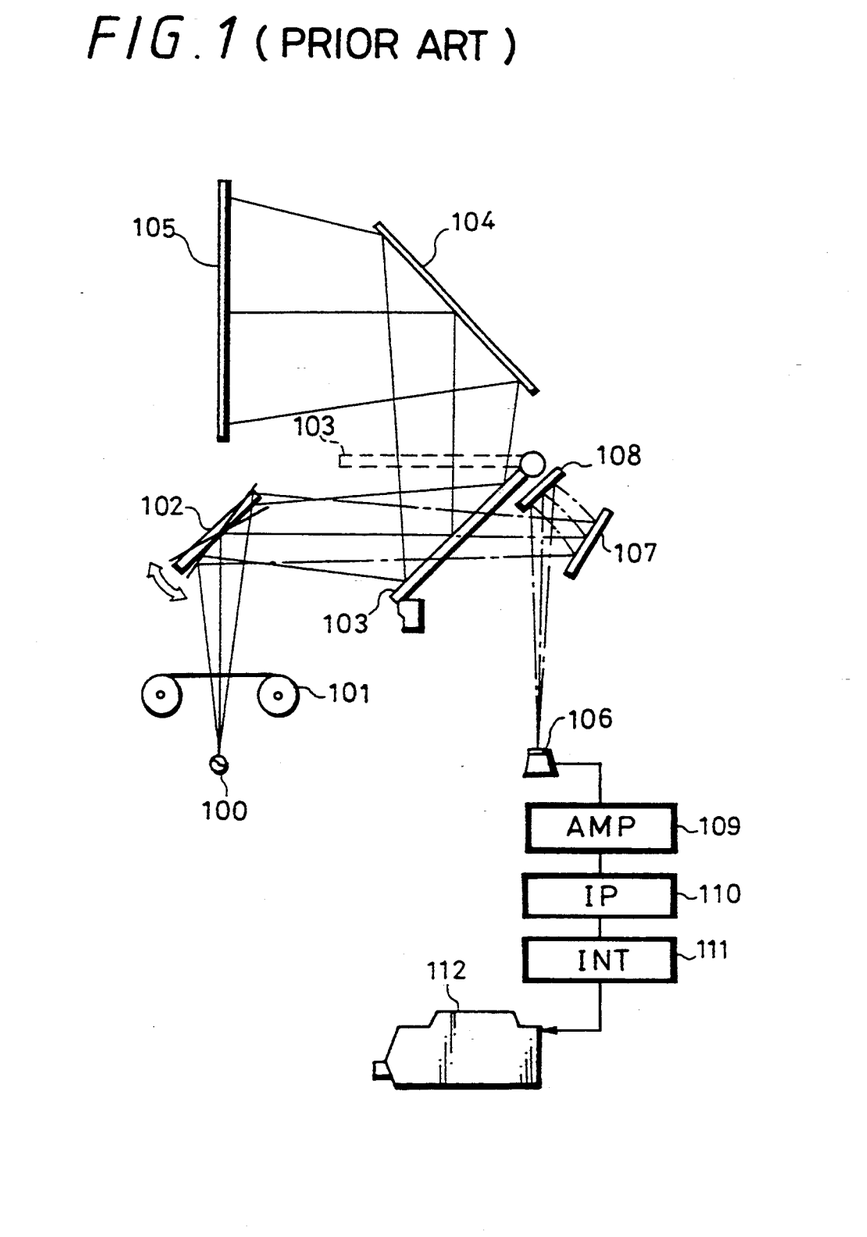
FIG. 1 is a perspective view of a conventional printing and monitoring device.

For example, a printing device as shown in FIG. 1, is described in Japanese laid-open patent publication no. 3-102981. An image on a microfilm 101 is irradiated by an illumination lamp 100 and is projected to a large screen 105 or a reader printer 112. Specifically, the image from microfilm 101 is transmitted along a first optical path to a scanning mirror 102 to either an optical path switching mirror 103 or a reflecting mirror 107, along a second optical path. If optical path switching mirror 103 is in position to intercept the second optical path (indicated by the solid line), the image is reflected over third and fourth optical paths via mirror 103 and reflecting mirror 104 to large screen 105 for displaying the image.

If a hard copy of the image is required, then optical path switching mirror 103 is adjusted out of the first optical path, as indicated by the broken-line, so that the image is transmitted from scanning mirror 102 to reflecting mirror 107. The image is reflected to reflecting mirror 108 along a third optical path and thereafter reflected to a linear photosensor 106 along a fourth optical path. Linear photosensor 106 reads the transmitted image and supplies image data for amplification and processing by an amplifier 109 and an image processing circuit 110, respectively. The processed image data is supplied to a printer 112, via an interface 111, for producing a hard copy of the image.

However, this conventional arrangement is undesirable since it requires a significant amount of space. Further, the above apparatus is not portable since it requires an optical system comprising a plurality of optical paths for displaying the image on a large-size screen or a printer for producing hard copies.

OBJECTS OF THE INVENTION

Therefore, it is an object of the present invention to provide an improved printing and monitoring apparatus which overcomes the aforementioned disadvantages and drawbacks associated with the prior art.

Another object of this invention is to provide a portable apparatus capable of selectively printing an image on film or displaying the image on a screen.

A further object of this invention is to provide a portable apparatus having a simple optical system for displaying the image on a screen in a monitor mode.

An additional object of this invention is to provide a portable apparatus having a film exposed with different frequency components of a color image transmitted through an optical filter assembly for producing a high resolution hard copy.

Various other objects, advantages and features of the present invention will become readily apparent from the ensuing detailed description, and the novel features will be particularly pointed out in the appended claims.

SUMMARY OF THE INVENTION

In accordance with this invention, a portable apparatus is provided that is capable of printing an image on a film and monitoring the image on a display screen. An image generator, such as a CRT, generates a viewable image. The display screen is in optical communication with the image generator and defines a first optical path. A first reflector is selectively movable into the first optical path to intercept the generated image in order to reflect the image over a second folded optical path, defined by second and third reflectors, to the film. Along the second folded optical path is an optical filter for filtering predetermined frequency components of the generated image. In a print mode, the first reflector is rotated into the first optical path, such that the film is in optical communication with the image generator for exposing the film to the generated image. Further, in a monitor mode, the first reflector is rotated out of the first optical path, such that the display screen is in optical communication with the image generator for displaying the generated image.

Preferably, the optical filter includes separate red, green and blue component filters that are rotatable. In this preferred embodiment, the red, green and blue components of an image are separately transmitted through each respective component filter and to the film for exposure.

As another embodiment of this invention, the first reflector is fixed in the first optical path and comprises a half-silvered mirror capable of simultaneously maintaining optical communication between the image generator and both the display screen and the film.

As a further embodiment of this invention, the first reflector comprises a beam splitter capable of simultaneously maintaining optical communication between the image generator and both the display screen and the film.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF CERTAIN PREFERRED EMBODIMENTS

Figure 4A:
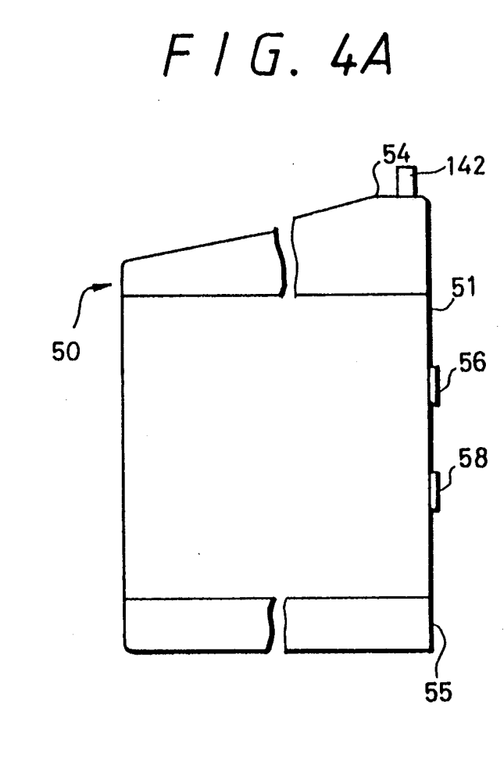
FIG. 4A is a side view of the portable apparatus in accordance with the present invention.
Figure 4B:
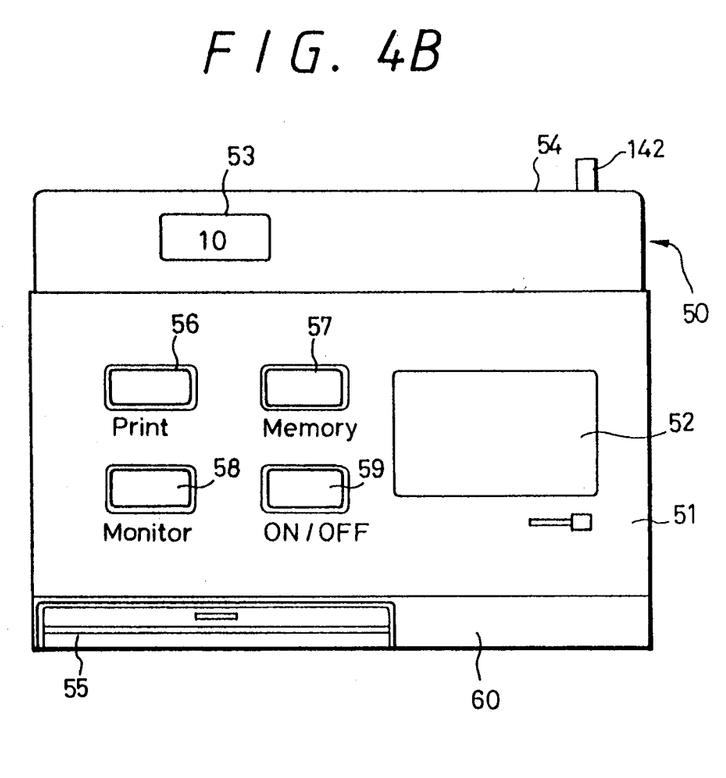
FIG. 4B is a front view of the portable apparatus in accordance with the present invention.

Referring now to the drawings, wherein like reference numerals are used throughout, FIGS. 4A and 4B illustrate the external appearance of the present invention. As illustrated, the portable apparatus is comprised of a substantially rectangular parallelpiped casing 50 having preferred dimensions of 150 cm. (width)×150 cm. (depth)×80 cm. (height). It will be appreciated that these dimensions are provided here simply as a numerical example and are not intended to limit the present invention thereto. Casing 50 includes a front panel 51 having a display screen 52 for displaying a viewable image. Display screen 52 is fitted with a transparent panel comprising a Fresnel lens or the like which allows the viewer to directly see the viewable image displayed on the screen. Push buttons 56, 57, 58 and 59 represent a print switch, a memory switch, a monitor switch and an on-off switch, respectively, whose functions will be described later.

Casing 50 further comprises a trapezoidally shaped inclined roof 54 which includes a counter display window 53 for displaying the number of hard copies printed (shown displaying 10 hard copies) and a slidable knob 142 for manually selecting a print or monitor mode, that will be described later in greater detail.

Additionally, the bottom of casing 50 includes a substantially rectangular film storage unit 60 having a pivoting film pack insertion enclosure 55.

Figure 5:
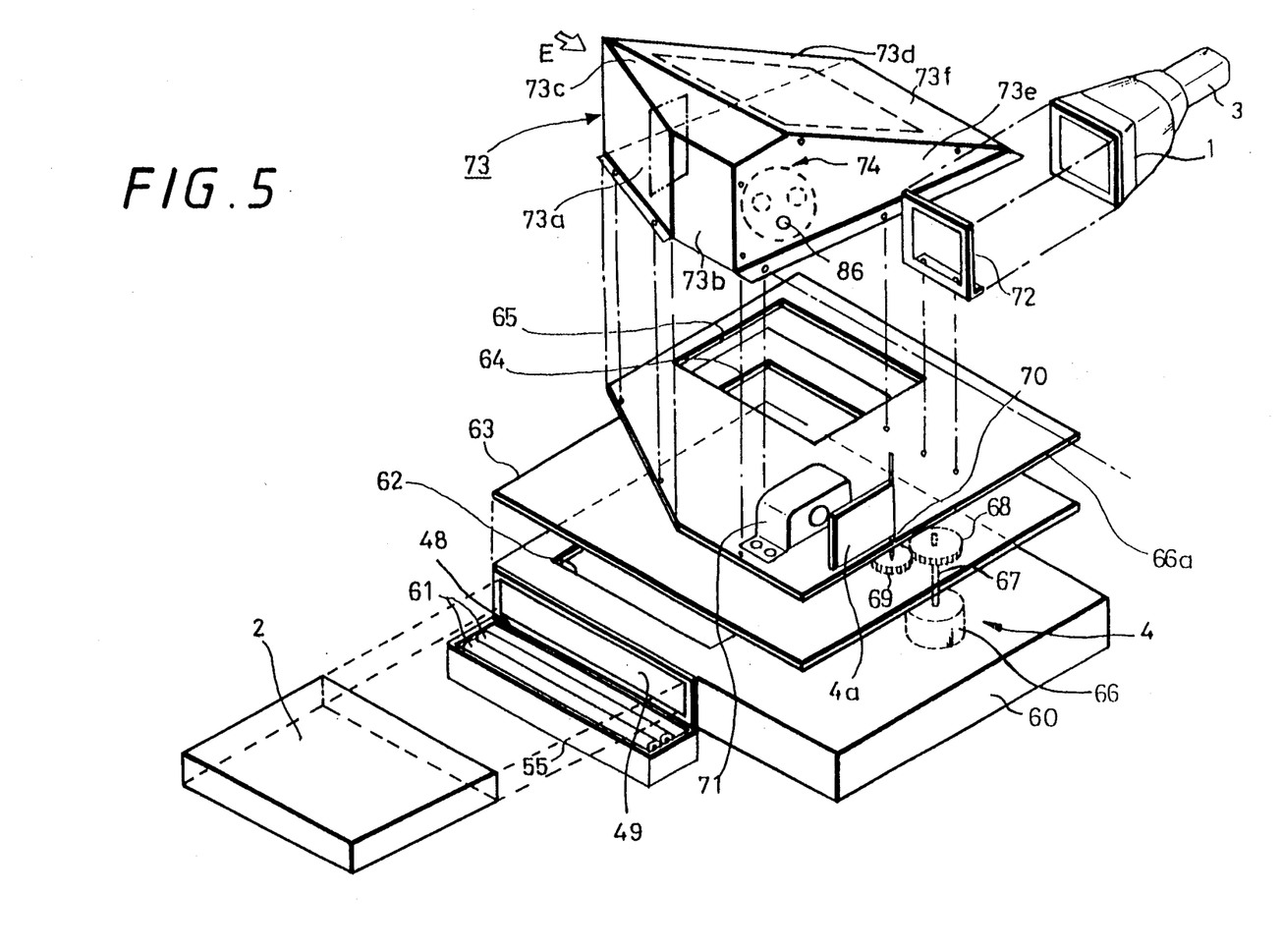
FIG. 5 is an exploded perspective view of the interior of the portable apparatus in accordance with the present invention.

As shown in FIG. 5, film pack insertion enclosure 55 is coupled to the film storage unit by a hinge 48, such that the film pack insertion enclosure pivots to an open position for inserting an instant photosensitive film pack 2, consisting of a plurality of optically exposable film (not shown), through rectangular opening 49. The film may be a silver-salt composition or the like. The film pack insertion enclosure houses a pair of rollers 61 rotatably mounted therein. After the film is exposed to an image, the film exits the film storage unit through rollers 61 of film pack insertion enclosure 55.

Additionally, film storage unit 60 houses an optical path switching assembly 4 which comprises a reflector rotating motor 66, a motor shaft 67 extending from the reflector rotating motor, a first spur gear 68 mounted the end of motor shaft 67, a second spur gear 69 held in mesh with the first spur gear 68, and an angularly movable shaft 70 extending from the second spur gear which extends through film storage unit 60. Optical path switching assembly 4 further includes a rotatable first reflector 4a, housed outside the film storage unit, and coupled to shaft 70.

The top of film storage unit 60 includes a rectangular open window 62 for exposing the film therethrough when the film pack is housed in the top of film storage unit. A rectangular blind plate 63 is coupled between the top of film storage unit 60 and a five-sided bottom plate 66a of a light-proof housing 73. The blind plate 63 has an exposure window 64 having substantially the same area as the exposure surface of the film, disposed over a portion of open window 62 of film storage unit 60. Further, bottom plate 66a has an exposure window 65 that is substantially the same size as exposure window 64.

An optical system block 71, having at least one optical lens (not shown) for enlarging a generated image reflected from first reflector 4a, is mounted on bottom plate 66a.

An image generator 1, whose diameter may be on the order of, for example, 1 inch, is coupled to the bottom plate 66a by an L-shaped bracket 72. Image generator 1 may be, for example, a cathode-ray tube (CRT) or a liquid crystal display. The image generator includes a source of illumination 3 and the image generated thereby is transmitted to the film in a print mode or to the display screen in a monitor mode.

Light-proof housing 73 is mounted on bottom plate 66a and houses a second and a third reflector 5 and 6, respectively. The light-proof housing is illustrating as comprising, for example, a triangular side wall 73d in parallel with a trapezoidal side wall 73e. The light-proof housing further includes rectangular side walls 73a and 73b, an inclined rectangular side wall 73f and a trapezoidal roof 73c. Side wall 73e includes a hole 86 positioned between optical system block 71 and an optical filter assembly 74, the latter being disposed within housing 73.

Figure 2:
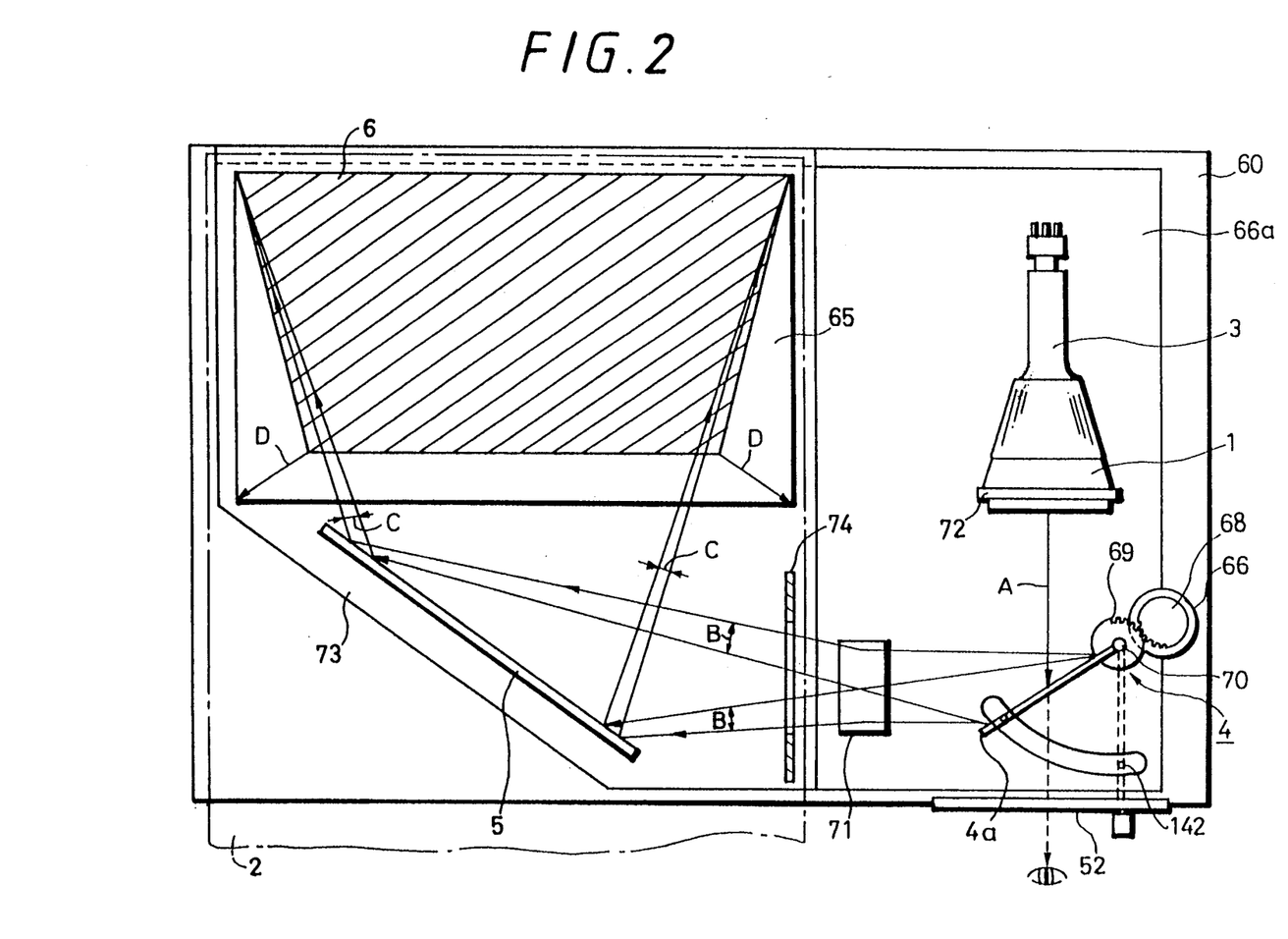
FIG. 2 is a top elevational view of an optical system of a preferred embodiment of the portable apparatus in accordance with the present invention.
Figure 3:
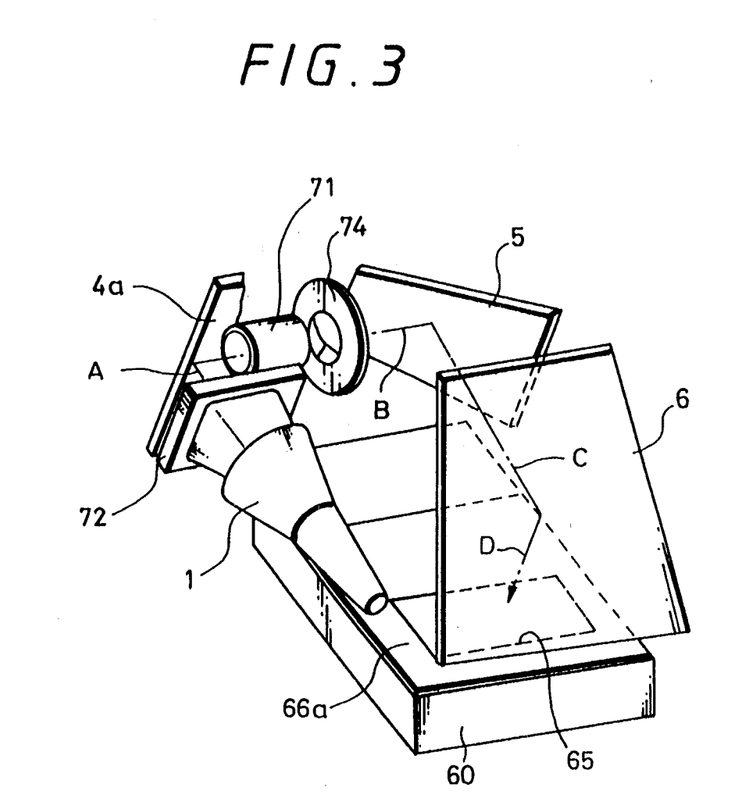
FIG. 3 is a perspective view of the optical system of the portable apparatus in accordance with the present invention.

FIGS. 2 and 3 illustrate the optical paths of the present invention for the print and monitor modes. Image generator 1 generates an image and optically transmits the image, along a first optical path A.

For displaying the generated image when the apparatus operates in the monitor mode, first reflector 4a is angularly rotated to a position indicated by the broken-line in FIG. 2, either manually by slidable knob 142 or electrically by reflector rotating motor 66. When first reflector 4a is in the broken-line position, display screen 52 is in optical communication with image generator 1 over first optical path A, thereby displaying the viewable image.

When the apparatus operates in the print mode to expose the film to an optically transmitted image, first reflector 4a is angularly rotated to the solid-line position shown in FIG. 2, either manually by slidable knob 142 or electrically by drive motor 66. The generated image is reflected by first reflector 4a and is optically transmitted to second reflector 5 over a second optical path B through at least one lens in optical system block 71 (for enlarging the image) and through optical filter assembly 74 (for filtering predetermined frequency components), described later in greater detail.

The image reflected from second reflector 5 is optically transmitted to third reflector 6 along a third optical path C. The film contained in film pack 2 is exposed to the image reflected from third reflector 6 along a fourth optical path D, for producing a hard copy.

Figure 6A:
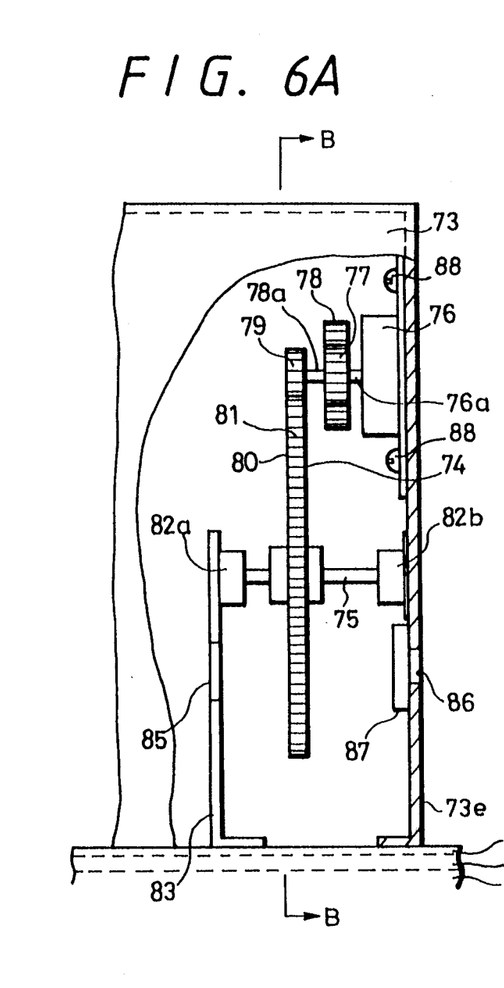
FIG. 6A is a side cross-sectional view of an optical filter assembly of the present invention.
Figure 6B:
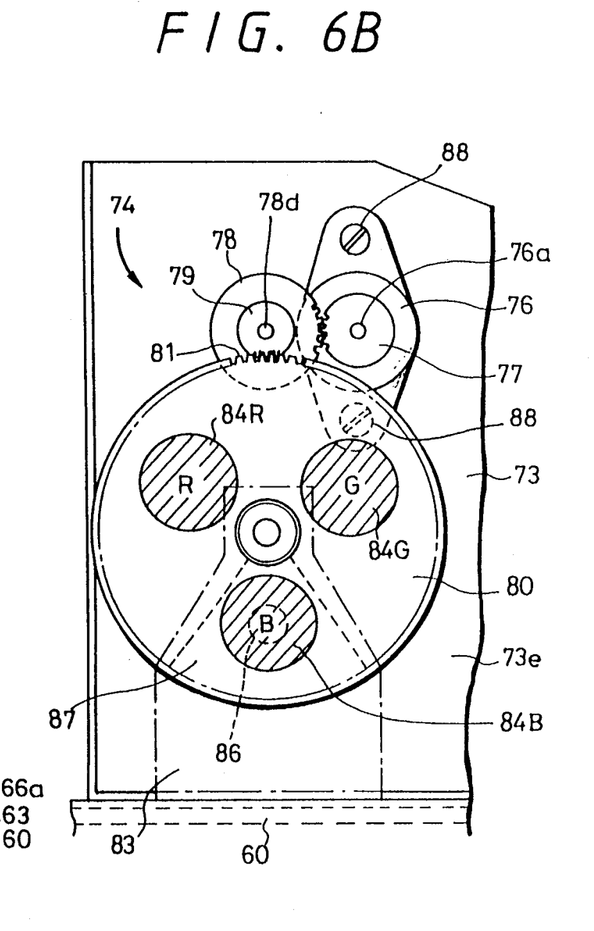
FIG. 6B is a front elevational view of the optical filter assembly of the present invention.

The optical filter assembly 74 will now be described with reference to FIGS. 6A and 6B. FIG. 6A illustrates a cross-sectional view of the optical filter assembly within housing 73 and FIG. 6B illustrates the optical filter assembly viewed in the direction indicated by section lines B—B.

Optical filter assembly 74 includes a filter motor 76, for driving a rotatable filter wheel 80, the filter motor being attached to side wall 73e of light-proof housing 73 by a pair of screws 88. A drive shaft 76a extending from filter motor 76 supports a first gear 77 which is held in mesh with a second gear 78. A drive shaft 78a is supported in cantilevered fashion from side wall 73e and extends through second gear 78 to a third gear 79 which is held in mesh with a fourth gear 81 on the periphery of filter wheel 80.

Filter wheel 80 is rotatably supported by a rotatable shaft 75 which extends between bearings 82a and 82b. Bearing 82a is mounted on an L-shaped support member 83 and bearing 82b is mounted on side wall 73e. The support member includes an aperture 85 aligned with aperture 86 of side wall 73e along the second optical path B such that the generated image may be transmitted through these apertures. Both support member 83 and side wall 73e are affixed to the bottom plate 66a of light-proof housing 60.

Filter wheel 80 comprises circular filter components 84R (red), 84G (green) and 84B (blue). The centers of the circular filter components form an equilateral triangle and are spaced equidistant from the center of the filter wheel.

The filter wheel is rotatable by drive motor 76 to three positions, 'R', 'G' and 'B', respectively. In the print mode, the filter wheel is set to the initial 'R' position whereat red filter component 84R is aligned between apertures 85 and 86. In this manner, the generated image, transmitted over the second optical path B, passes through the red filter component 84R so that only red color components are transmitted to the film pack. Similarly, when the filter wheel rotates to its 'G' and 'B' positions, the green and blue filter components, respectively, are disposed in the second optical path B so that only the green and blue color components are transmitted to the film pack.

In other words, when the print mode is activated, the generated image is transmitted through the filter in the initial 'R' position to expose the film only to the red color component of the generated image. Thereafter, the filter wheel is rotated into the 'G' position to expose the film to the green color component of the generated image. This procedure is repeated when the filter wheel is rotated to the 'B' position to expose the film to the blue color component of the image. Film exposure is complete after the film is exposed to all three R, G and B color components of the generated image. As will be discussed in greater detail, individual R, G and B image components may be separately transmitted from image generator 1 to corresponding R, G and B filter components to improve the resolution and picture quality of the hard copy.

As shown in FIG. 6B, a shutter 87 is attached to side wall 73e and is interposed between filter wheel 80 and optical system block 71. The shutter is operated by a solenoid or the like (not shown), and when open, the generated image transmitted along the second optical path B passes through the filter wheel in the light-proof housing 73 and is reflected to the film in film pack 2. When shutter 87 is closed, the film is not exposed to the generated image.

Figure 7:
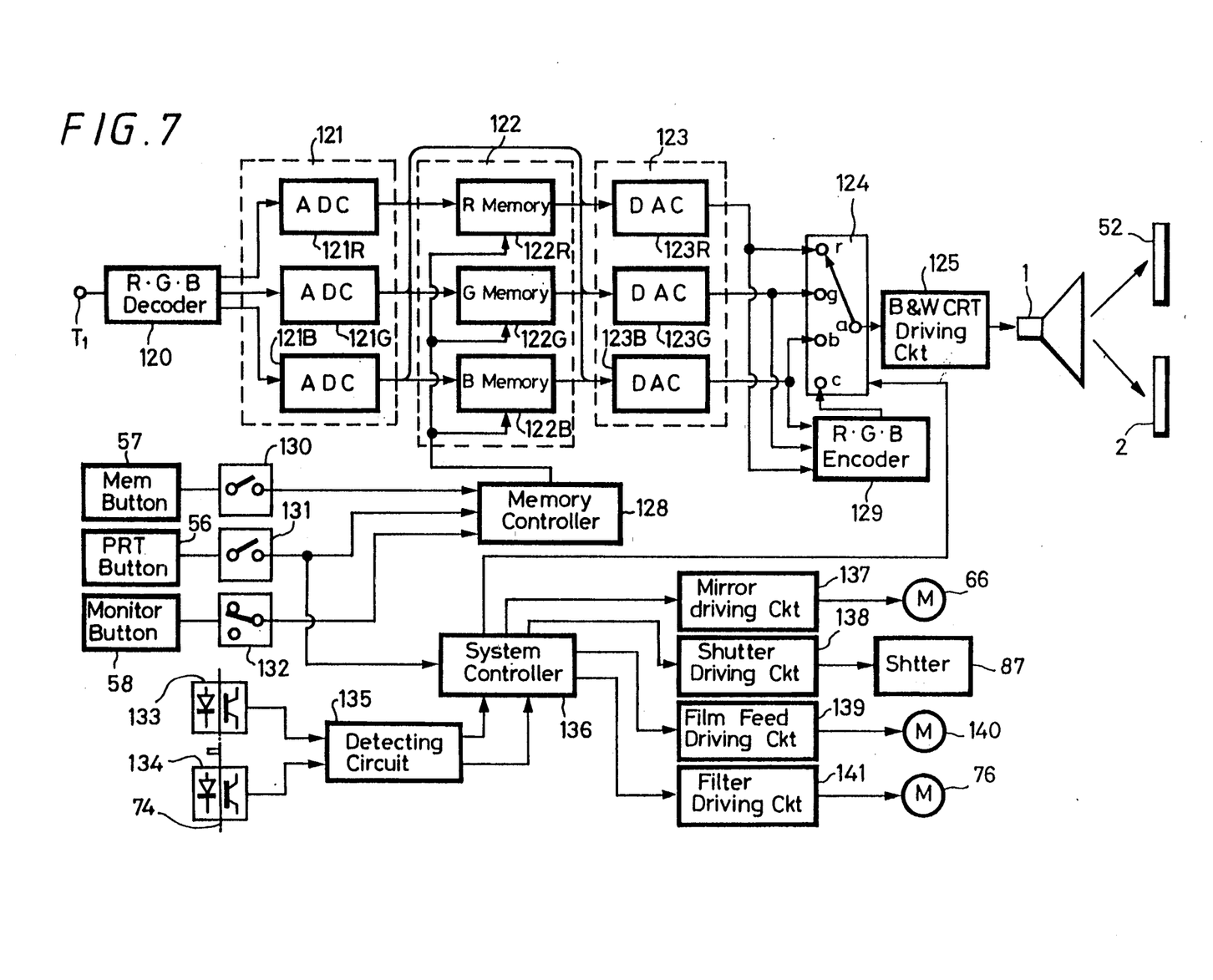
FIG. 7 is a block diagram of the circuitry used in accordance with the present invention.

The circuitry of the portable apparatus will now be described with reference to FIG. 7. A composite color video signal is supplied to an input terminal T1 and sent to an RGB decoder 120 which separates the composite color video signal into individual R, G and B component signals. The R, G and B component signals are supplied to respective analog-to-digital converters (ADCs) 121R, 121G and 121B in ADC block 121, which digitizes the R, G and B component signals.

The digitized R, G and B component signals are selectively stored in corresponding R, G and B memory units 122R, 122G and 122B in memory block 122, depending upon a memory control signal supplied to memory block 122 by a memory controller circuit 128. If the generated image is to be printed, either before or after monitoring, the digitized component signals will be stored in memory block 122. When printing the hard copy is desired, the stored digitized component signals are supplied to respective digital-to-analog converters (DACs) 123R, 123G and 123B in DAC block 123. If the generated image will be viewed only (and not printed), the digitized component signals are not stored but are supplied directly to respective DACs 123R, 123G and 123B. DAC block 123 converts the digitized component signals into corresponding analog component signals.

The analog R, G and B component signals are supplied from DAC block 123 to respective 'r', 'g' and 'b' contacts in switcher 124 and to an RGB encoder 129. RGB encoder 129 encodes the analog R, G and B component signals into a corresponding color composite signal and supplies this color composite signal to contact 'c' in switcher 124. The switcher, which is shown as an electromechanical switch for convenience but preferably is implemented as a solid state switch or as a multiplexer, is controlled by a control signal from a system controller 136 (for example, a CPU), depending upon whether the print or monitor mode is selected. In the print mode, output terminal 'a' is connected to contacts 'r', 'g' and 'b', successively. In this manner, the component signals are separately supplied to a black-and-white driving circuit 125 which drives an image generator 1, such as a black-and-white CRT. A black-and-white CRT is preferable since it is relatively inexpensive compared with a color CRT. The individual R, G and B color image components are transmitted over the first and second optical paths (previously described) from CRT 1 to respective filter components 84R, 84G and 84B of filter wheel 80. Transmitting separate component images, rather than transmitting a single color composite image, to the filter wheel, improves the resolution and picture quality of the hard copy.

In the monitor mode, output terminal 'a' supplies the encoded composite signal from contact 'c' to the image generator 1 (preferably, but not necessarily, a black-and-white CRT) via the black-and-white driving circuit for displaying the image on display screen 52.

The memory controller 128 will now be described. Memory controller 128 is supplied with control signals from either a memory switch 130, a print switch 131, or a monitor switch 132. If the operator of the portable apparatus wishes to view the image, then the monitor push button 58 is pressed which activates the monitor switch 132 to trigger memory controller 128 to supply a 'non-storing' control signal to the memory block 122 so that the digitized component signals from ADC block 121 are not stored.

If the operator wishes to print the image after viewing, the memory push button is pressed to activate memory switch 132 which triggers memory controller 128 to supply a 'write in' control signal to the memory block 122 to store the digitized component signals from ADC block 121. Subsequently, when the operator wishes to obtain a hard copy of the displayed image, the print push button is pressed which activates the print switch to trigger memory controller 128 to supply a 'read out' control signal for reading out the digitized component signals from memory block 122. These signals control CRT 1 to generate an image corresponding thereto, and the image is transmitted to the film.

Additionally, a second output signal from print switch 131 is supplied to the system controller 136 which responds thereto to activate the reflector rotating motor 66, the filter motor 76, the shutter 87 and the film feed motor 140. Once system controller 136 is supplied with the output signal from the print switch, the system controller is further supplied with detecting signals from a pair of photo sensors 133 and 134, via a detecting circuit 135. Photo sensors 133 and 134 detect the position of the filter wheel 80.

Figure 8:
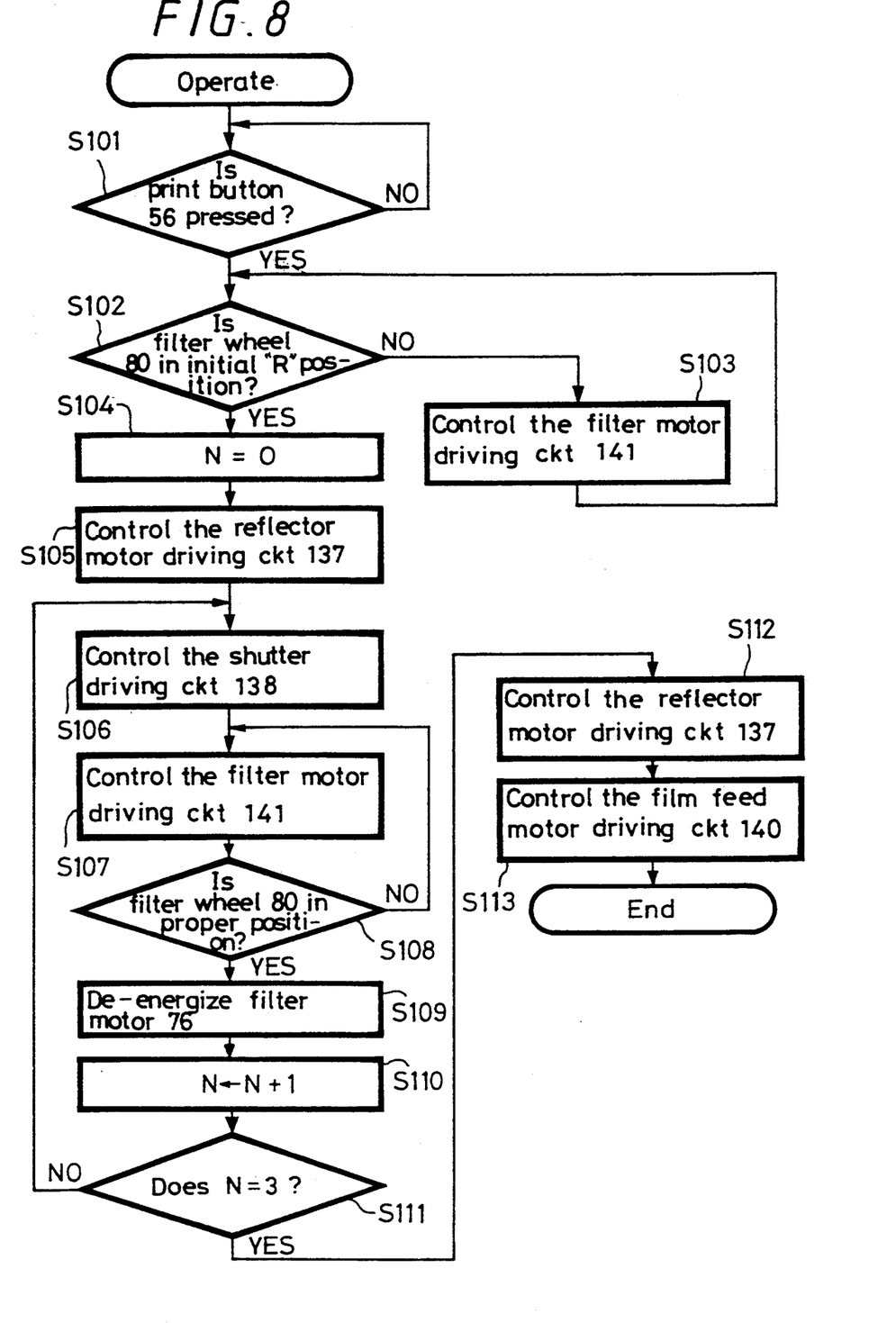
FIG. 8 is a flow chart representing the routine carried out by the system controller of FIG. 7.

The print routine carried out by the system controller 136 now will be described with reference to the flow chart illustrated in FIG. 8.

Beginning with inquiry S101, a determination is made as to whether print button 56 has been pressed. If the determination is negative, the routine cycles through inquiry S101 until the print button is pressed. When this inquiry is answered in the affirmative, the routine proceeds to inquiry S102 whereupon the system controller checks the detecting signals from photo sensors 133 and 134 to determine if the initial position of filter wheel 80 is in the 'R' position. If inquiry S102 is answered in the negative, processing proceeds to instruction S103 and the system controller supplies a control signal to filter motor driving circuit 141 to energize filter motor 76 to drive the filter wheel to its 'R' position; and inquiry S102 is repeated. When inquiry S102 is answered in the affirmative, processing proceeds to instruction S104.

At instruction S104, a counter 'n' is set to the value of 'O' and the routine advances to instruction S105, whereat the system controller supplies a control signal to mirror driving circuit 137 for activating reflector rotating motor 66. The reflector rotating motor rotates reflector 4a from the position indicated by broken-lines, to the position represented by solid-lines in FIG. 2. Processing then continues to instruction S106, whereat system controller 136 supplies a control signal to the shutter driving circuit 138 which opens shutter 87 for a predetermined amount of time. The generated image thus passes through optical filter assembly 74 to the film in film pack 2. Shutter 87 then closes and processing proceeds to instruction S107.

At instruction S107, system controller 136 supplies a control signal to the filter motor driving circuit 141 for energizing filter motor 76 from the initial 'R' position of filter wheel 80 to the next position, such as the 'G' position, of the filter wheel. Thereafter, the routine proceeds to inquiry S108, whereupon the system controller checks the detecting signals supplied from the photo sensors to determine whether the position of filter wheel 80 is in its 'G' position. If inquiry S108 is negative, processing returns to instruction S107 and the system controller applies a control signal to the filter motor driving circuit to drive filter motor 76 to rotate the filter wheel to the 'G' position and inquiry S108 is repeated. If, on the other hand, inquiry S108 is answered in the affirmative, the routine proceeds to instruction S109 and system controller 136 applies a control signal to the filter motor driving circuit to de-energize the filter motor. Processing then continues to instruction S110, whereat the value of '1' is added to the count of counter 'n', such that the count value is incremented to '1' (1+0=1). Thereafter, the routine inquiries at S111 if 'n' equals '3'. If this inquiry is answered in the negative (as it will be until shutter 87 is opened and closed three times), the system controller returns to instruction S106 and instructions S106 to S111 are repeated until 'n=3'. At that time, inquiry S111 is answered in the affirmative, and the routine proceeds to instruction S112.

At instruction S112, the system controller applies a control signal to the reflector motor driving circuit to activate the reflector motor and return reflector 4a to the position shown by the broken lines in FIG. 2. Thereafter, processing continues to instruction S113, whereat system controller 136 supplies the film feed motor driving circuit 139 with a control signal to energize film feed motor 140. As a result, the exposed film is transported out of opening 49 of film storage unit 60 through rollers 61 of film pack insertion enclosure 55. Hence, a hard copy of the generated image is printed.

Figure 9:
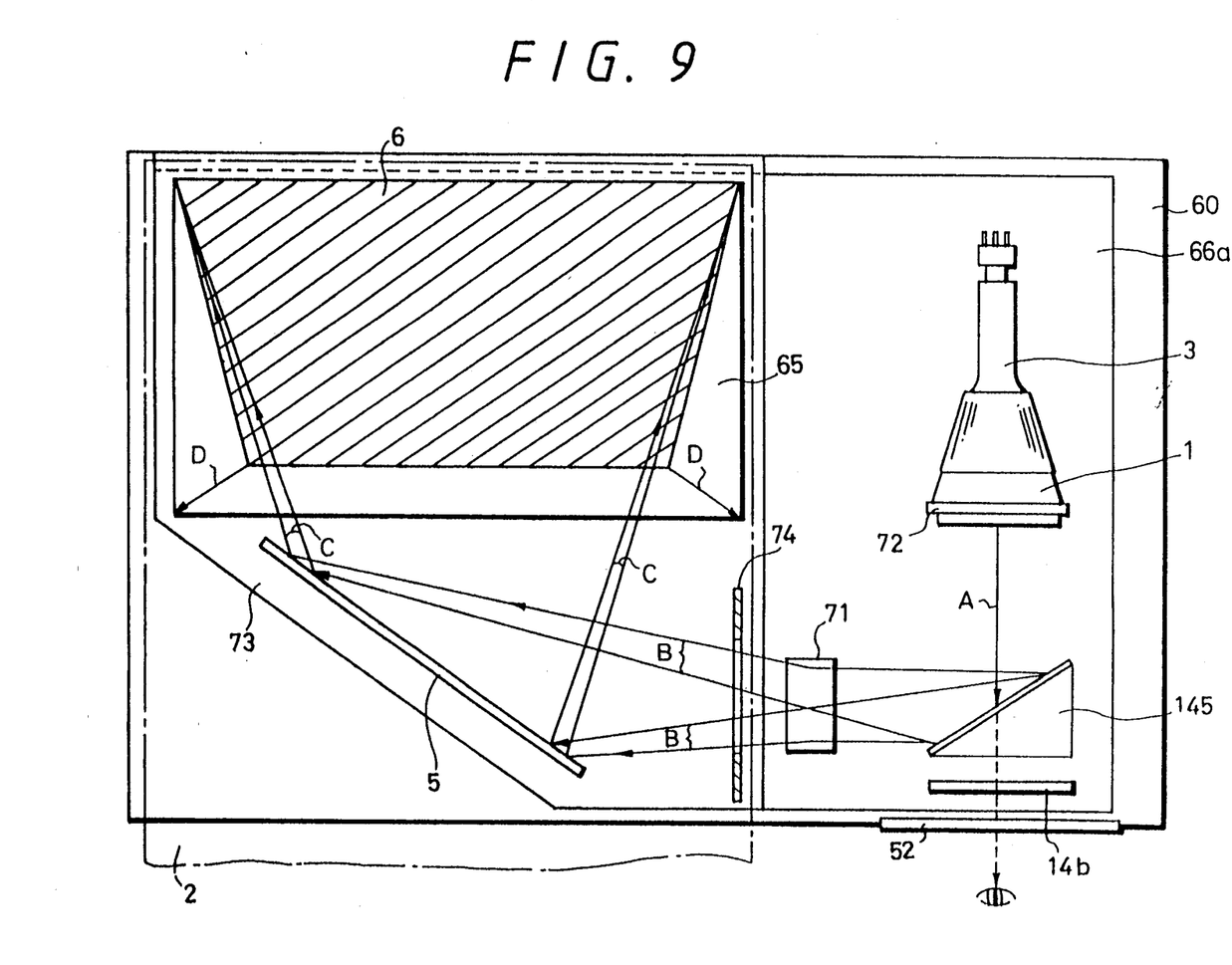
FIG. 9 is a top elevational view of an optical system of a further embodiment of the portable apparatus in accordance with the present invention.

FIG. 9 illustrates a portable apparatus in accordance with another embodiment of the present invention. Unlike the portable apparatus of FIG. 2, wherein optical path switching assembly 4 includes a movable reflector 4a, reflector drive motor 66 and a plurality of gears, the portable apparatus of FIG. 9 replaces the optical path switching assembly with a stationary half-silvered mirror or beam-splitter 145. The half-silvered mirror or beam-splitter is positioned at the same angle (e.g. 45°) as the first reflector shown in solid lines in FIG. 2.

Since the use of the half-silvered mirror or beam-splitter continuously keeps display screen 52 in optical communication with the image generator via the first optical path, it is preferred to use a liquid-crystal shutter 146 to interrupt the displayed image. When film pack 2 is exposed to the generated image, the liquid-crystal shutter is closed. Conversely, when the generated image is to be monitored (i.e. displayed), the shutter is opened. Replacing optical path switching assembly 4 with the half-silvered mirror or beam-splitter and liquid crystal shutter reduces the complexity of the portable apparatus by eliminating numerous moving parts.

While the present invention has been pictorially shown and described with reference to preferred embodiments thereof, it will be appreciated by those of ordinary skill in the art that various changes and modifications may be made without departing from the spirit and scope of the invention. It is intended that the appended claims be interpreted as including the embodiments described herein, the alternatives mentioned above and all equivalents thereto.

What is claimed is:

1. Portable apparatus selectively operable in print and monitor modes for printing and monitoring, respectively, a color an image, comprising:
   a light-proof housing;
   means for receiving a composite color video signal for providing red, green and blue component signals therefrom;
   image generating means for generating a viewable image;
   means for receiving said red, green and blue component signals and being operative, in said prior mode, to supply said red, green and blue component signals in succession to said image generating means;
   means for receiving said red, green and blue component Signals and being operative, in said monitor mode, to form a composite image signal therefrom and to supply said composite image signal to said image generating means;

a display screen in optical communication with said image generating means to define a first optical path and to display said viewable image;

means for defining a second folded optical path;

reflecting means selectively movable into said first optical path to intercept the image generated by said image generating means and reflect said image over said second folded optical path;

drive means coupled to said first reflecting means for driving said first reflecting means into and out of said first optical path;

optically exposable film positioned to receive said image reflected over said second folded optical path; and optical filter means disposed in said housing and having red, green and blue portions selectively interposed in said second folded optical path in synchronization with the successive supplying of said red, green and blue component signals to said image-generating means in said print mode for successively passing red, green and blue color components of the image reflected over said second folded optical path to said optically exposable film.

2. The portable apparatus according to claim 1, wherein said drive means drives said reflecting means into said first optical path in said print mode and out of said first optical path in said monitor mode.

3. The portable apparatus according to claim 1, wherein said reflecting means comprises an angularly movable reflecting mirror.

4. The portable apparatus according to claim 1, wherein said drive means comprises a manually rotatable knob and an electrical motor for selectively driving said reflecting means either manually or electrically, respectively.

5. The portable apparatus according to claim 1, wherein said optically exposable film comprises a silver-salt composition.

6. Portable apparatus selectively operable in print and monitor modes for printing and monitoring, respectively, an image, comprising:

a light-proof housing;

image generating means for generating a viewable image;

a display screen in optical communication with said image generating means to define a first optical path and to display said viewable image;

first reflecting means selectively movable into said first optical path to intercept the image generated by said image generating means and reflect said image over a second folded optical path;

drive means coupled to said first reflecting means for driving said first reflecting means into and out of said first optical path;

second and third reflecting means disposed in said housing for defining said second folded optical path;

optically exposable film positioned to receive said image reflected over said second folded optical path;

optical filter means disposed in said housing for selectively passing predetermined color components of the image transmitted to said optically exposable film;

decoding means supplied with a composite color video signal for decoding said composite color video signal into respective red, green and blue component signals;

memory means for selectively storing each of said red, green and blue component signals in respective memory units;

memory control means for controlling said memory means to selectively store each of said red, green and blue component signals in said respective memory units based on whether said first reflector is in or out of said first optical path;

encoding means for encoding said red, green and blue component signals from said decoding means into a composite image signal; and means for supplying said composite image signal from said encoding means to said image generating means to generate a viewable image therefrom.

7. The portable apparatus according to claim 6, wherein said means for supplying said composite image signal from said encoding means includes switching means operable in said monitor mode for coupling said composite image signal from said encoding means to said image generating means, and operable in said print mode to couple said red, green and blue component signals stored in said memory means to said image generating means.

8. The portable apparatus according to claim 7, wherein said image generating means comprises a cathode ray tube.

9. The portable apparatus according to claim 7, wherein said optical filter means comprises a rotatable optical filter having separate red, green and blue filter components.

10. The portable apparatus according the claim 9, wherein said optical filter means further comprises second drive means coupled to said rotatable optical filter for rotating only one of said red, green or blue filter components into optical communication with said image generating means at any one time.

11. The portable apparatus according to claim 1, wherein said display screen comprises a Fresnel lens.

12. Portable apparatus selectively operable in print and monitor modes for printing and monitoring, respectively, an image, comprising:

a light-proof housing;

image generating means for generating a viewable image;

a display screen in optical communication with said image generating means to define a first optical path and to display said viewable image;

means defining a second folded optical path;

reflecting means interposed between said image generating means and said display screen for selectively passing said image transmitted to said display screen or reflecting said image over said second folded optical path;

optically exposable film positioned to receive said image reflected over said second folded optical path;

means receiving a composite color video signal for providing red, green and blue component signals therefrom;

means receiving said red, green and blue component signals and being operative, in said print mode, for supplying said red, green and blue component signals in succession to said image generating means;

means receiving said red, green and blue component signals and being operative, in said monitor mode, for forming a composite image signal therefrom and supplying said composite image signal to said image generating means; and optical filter means disposed in said housing and having red, green and blue portions selectively interposed in said second folded optical path in synchronism with the successive supplying of said red, green and blue component signals to said image generating means in said print mode for successively passing red, green and blue color components of the image reflected over said second folded optical path to said optically exposable film.

13. The portable apparatus according to claim 12, wherein said reflecting means comprises a half-silvered mirror.

14. The portable apparatus according to claim 13, further comprising a liquid crystal shutter interposed between said half-silvered mirror and said display screen.

15. The portable apparatus according to claim 12, wherein said reflecting means comprises a beam splitter.

16. The portable apparatus according to claim 15, further comprising a liquid crystal shutter interposed between said beam splitter and said display screen.

* * * * *